Figure 3:
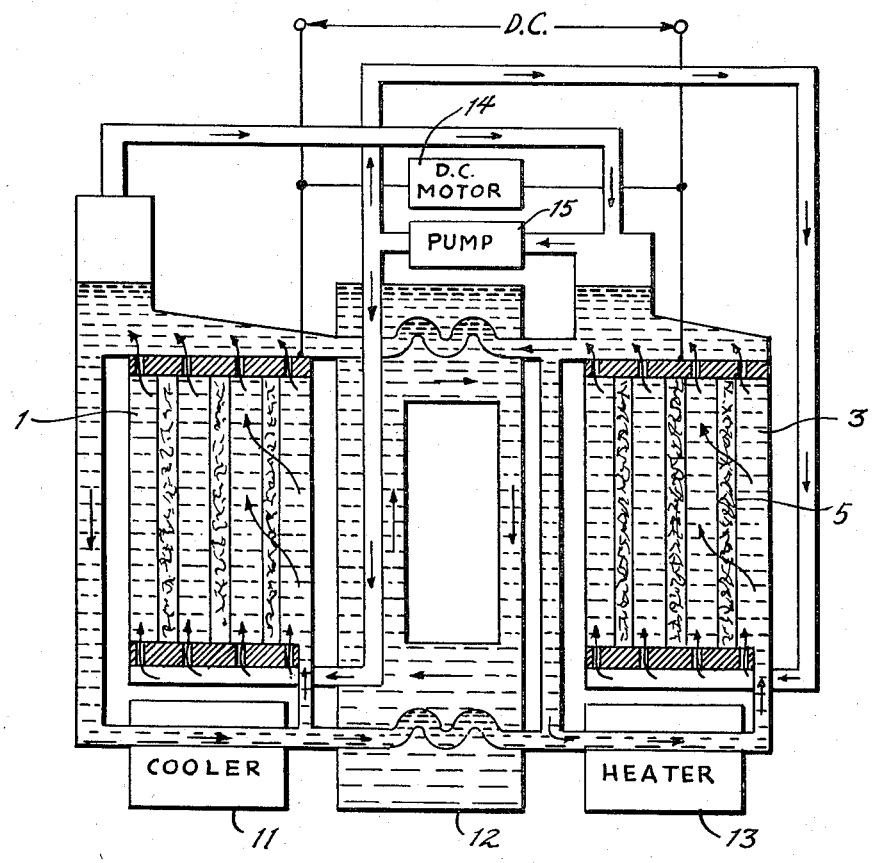

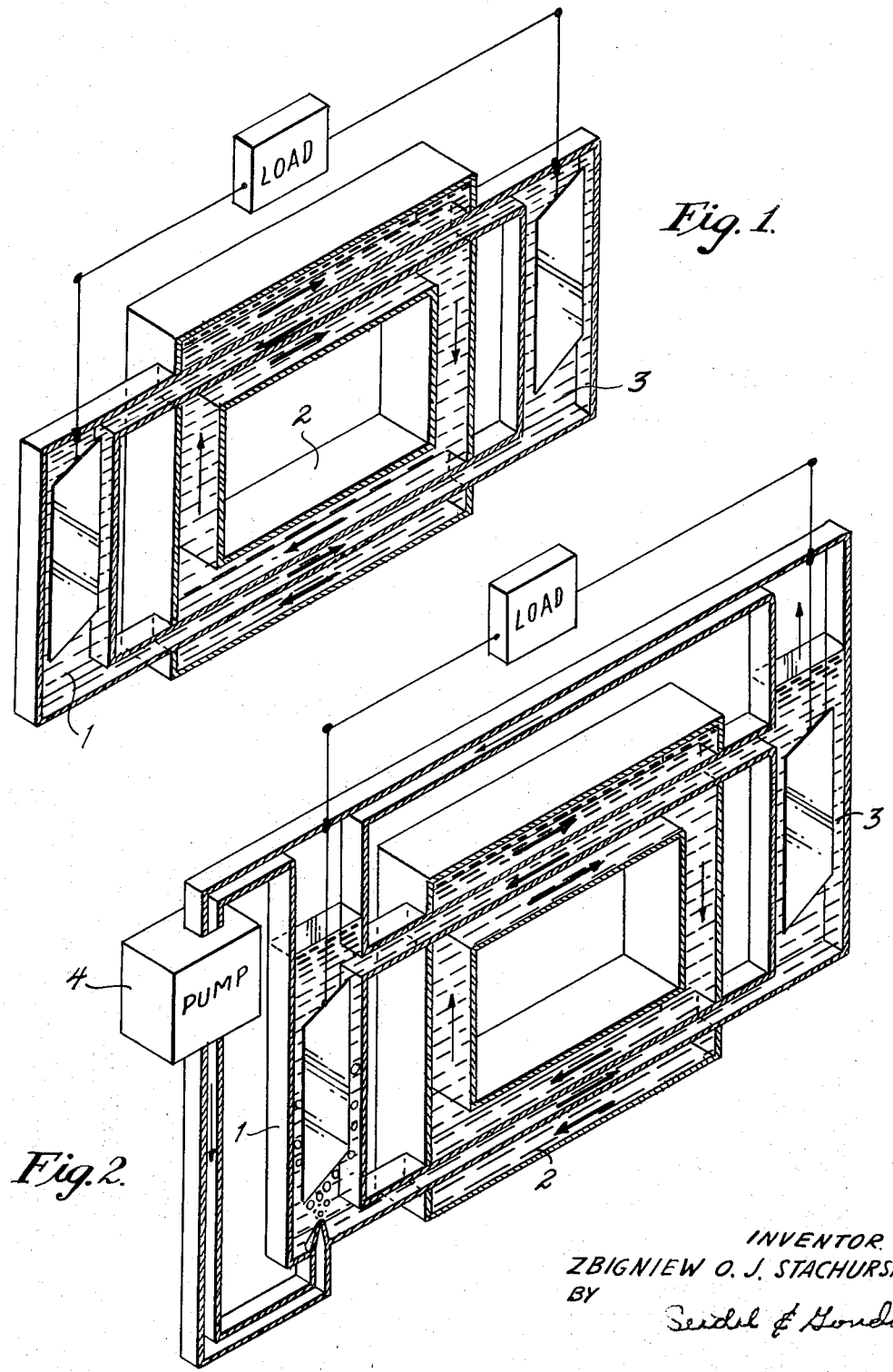

INVENTOR.
ZBIGNIEW O. J. STACHURSKI
BY
ATTORNEYS.

United States Patent Office 3,357,860
Patented Dec. 12, 1967

3,357,860
ELECTROCHEMICAL THERMO-GENERATOR
Zbigniew O. J. Stachurski, 4005 Baltimore Ave.,
Philadelphia, Pa. 19104
Filed Oct. 26, 1962, Ser. No. 233,386
6 Claims. (Cl. 136—83)

This invention relates to the process of direct conversion of heat into electricity.

In most of the thermoelectric generators the electricity is produced by the hot and cold junctions of two or more solids, usually semi-conductors.

According to the invention, instead of the hot and cold junctions of the conventional thermocell changes in potential of the electrochemical cells with the temperature are employed.

According to the invention the electrochemical reduction-oxidation cell is formed from two similar half-cells.

In each half-cell the same reversible reduction-oxidation reaction can run:

$$M^{ox} + ne^- = M^{red} \tag{1}$$

When both half-cells are at the same temperature the electrodes belonging to the half-cells have the same potentials. No current can be produced by such a system.

According to the invention one half-cell (FIG. 1; 1) is heated ($T_2$) and another (FIG. 1; 1) is cooled ($T_1$). In such case the potential difference between the hot and cold electrodes rises. This potential difference is proportional to the temperature difference between the both half-cells.

In order to maintain the concentration of the red-ox substance constant in time in both half-cells, the circulation of the solution between these half-cells is provided in the cell.

For preventing the heat transfer from the hot to the cold half-cell, a counter-current heat exchanger is used. (FIG. 1; 2).

In the cell the constant agitation and circulation of the material takes place, so that the activities ratio of oxidized form of the red-ox substance to the reduced form is constant.

$${}^aM^{ox}/{}^aM^{red} = \text{const} \tag{2}$$

When the condition (2) is fulfilled the thermoelectric E.M.F. coefficient can be easily derived from the Nerst equation:

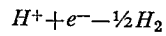

$$E = \frac{RT}{nF} \ln K + \frac{RT}{nF} \ln \frac{{}^aM^{ox}}{{}^aM^{red}} \tag{3}$$

Substituting in (3) the Arrhenium equation:

$$\ln K = -\frac{B}{RT} + A \tag{4}$$

(K-rate constant, B and A are constants), substituting Equation 3 for two temperatures $T_1$ and $T_2$, and subtracting them we get:

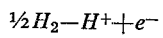

$$E_{21} = E_{T2} - E_{T1} = \left(\frac{RA}{nF} + \frac{R}{nF} \ln \frac{{}^aM^{ox}}{{}^aM^{red}}\right)(T_2 - T_1) \tag{5}$$

From the Equation 5 it is apparent that the thermoelectric potential $E_{21}$ is proportional to the temperature difference $(T_2-T_1)$ between the hot and cold half-cells.

Example

The thermo-electrochemical cell can be formed from the two hydrogen electrodes. Such a cell is shown in the FIG. 2. Alkaline or acidic hydrogen electrodes can be used. The well working thermoelectrochemical cell is formed by the two platinum black electrodes when the circulating electrolyte is concentrated sulfuric acid (96%). The total system is closed and is under the pressure of the hydrogen gas.

In the hot half-cell the discharge of the ionic hydrogen takes place.

$$H^+ + e^- \rightarrow \tfrac{1}{2} H_2$$

In the cold half-cell the reaction of ionization of gaseous hydrogen takes place:

$$\tfrac{1}{2} H_2 \rightarrow H^+ + e^-$$

Hydrogen is circulating in the system due to the pumping (FIG. 2; 4). The electrolyte is stirred by the gas and circulating due to natural heat convection.

When the temperature difference between the hot and cold half-cell is about 320° C. the electromotive force is 0.7 volt. When 0.6 ma./cm.² current flows the voltage is 0.6 volt. Corresponding power is 0.36 milliwatt/cm.².

According to the invention the active surface of the electrode is increased by the use of the porous mass.

Figure 4:
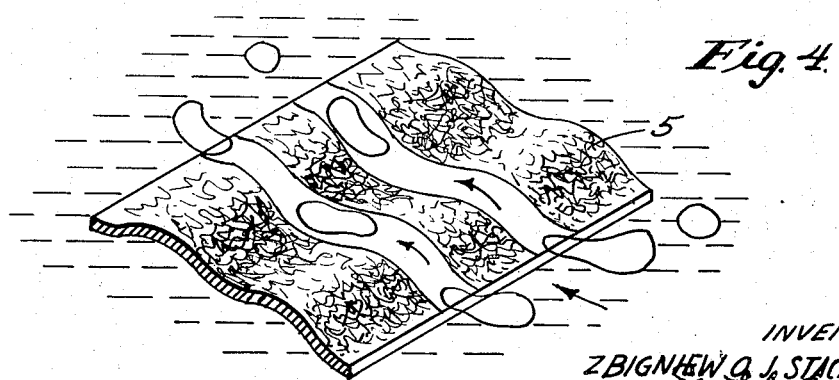

The electrode 5 is prepared from the sintered powdered metallic mass. (FIGS. 3 and 4.) The bubbles of the hydrogen are flowing along the declined porous plates. The electrolyte is constantly pumped through the plates, carrying through the hydrogen bubbles. (FIG. 4; 1.) In the FIG. 3, the complete battery of cold and hot electrodes is shown. Where: (11)-cooler; (12)-heat exchanger; (13)-heater; (14)-D.C. motor; (15)-pump.

The FIGURES 2, 3, 4 illustrate the acidic hydrogen electrode as well as alkaline.

According to the invention for alkaline hydrogen thermoelectric generators the concentrated alkali hydroxides are used. The electrode is from sintered Raney nickel. Hydrogen is under the increased pressure.

I claim:

1. An electrochemical thermal cell comprising first and second electrodes in an electrolyte, means for maintaining said second electrode at a higher temperature than said first electrode, means including first and second conduits providing for closed circuit circulation of the electrolyte between said electrodes, and heat exchanger means for cooling a portion of said first conduit so that heat will be absorbed from electrolyte therein moving from said second electrode toward said first electrode, and said heat exchanger means including a portion for heating said second conduit so that heat may be introduced into the electrolyte therein moving from said first electrode toward said second electrode, said heat exchanger means being a closed circuit system having a heat exchange medium traveling in a direction opposite to the direction of flow of said electrolyte.

2. A cell in accordance with claim 1 including pumping means for receiving gas from the electrolyte and contacting the electrodes with the gas, said gas being chemically inert with respect to the material of the electrodes.

3. A cell in accordance with claim 2 wherein said electrodes are hydrogen electrodes which are porous at least on their outer surface.

4. A cell in accordance with claim 1 wherein said electrolyte is a concentrated acid.

5. A cell in accordance with claim 1 wherein said electrolyte is a concentrated alkali-hydroxide.

6. A generator in accordance with claim 1 including means for sweeping a gas across the surface of the electrodes, and said electrodes being porous at least on their surface.

References Cited

UNITED STATES PATENTS

| 2,301,021 | 11/1942 | Dalpayrat | 136—83 |
| 2,301,022 | 11/1942 | Dalpayrat | 136—83 |
| 2,890,259 | 6/1959 | Weininger | 136—86 |
| 2,635,431 | 4/1953 | Bichowsky. | |

ALLEN B. CURTIS, *Primary Examiner.*

JOHN H. MACK, WINSTON A. DOUGLAS,
*Examiners.*

H. A. FEELEY, *Assistant Examiner.*